United States Patent
Auer et al.

(10) Patent No.: US 10,349,289 B2
(45) Date of Patent: Jul. 9, 2019

(54) DETERMINING RADIO CHANNEL METRICS

(71) Applicant: Telefonaktiebolaget LM Ericsson (publ), Stockholm (SE)

(72) Inventors: Gunther Auer, Stockholm (SE); Tsao-Tsen Chen, Täby (SE); Mattias Frenne, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 132 days.

(21) Appl. No.: 15/551,337

(22) PCT Filed: Mar. 20, 2015

(86) PCT No.: PCT/SE2015/050329
§ 371 (c)(1),
(2) Date: Aug. 16, 2017

(87) PCT Pub. No.: WO2016/153396
PCT Pub. Date: Sep. 29, 2016

(65) Prior Publication Data
US 2018/0035314 A1    Feb. 1, 2018

(51) Int. Cl.
*H04W 24/02* (2009.01)
*H04B 17/345* (2015.01)
(Continued)

(52) U.S. Cl.
CPC .......... *H04W 24/02* (2013.01); *H04B 17/345* (2015.01); *H04W 64/00* (2013.01); *H04W 88/085* (2013.01)

(58) Field of Classification Search
CPC .............................. H04W 24/02; H04W 88/085
(Continued)

(56) References Cited

U.S. PATENT DOCUMENTS

2013/0128760 A1    5/2013  Fujishima et al.
2015/0262163 A1*   9/2015  Belpaire ............ G06Q 20/3278
                                                      705/21

FOREIGN PATENT DOCUMENTS

WO    WO-2009151355 A1 * 12/2009 ............ H04W 36/30
WO    2014/076004          5/2014
WO    2016/128023          8/2016

OTHER PUBLICATIONS

International Search Report and Written Opinion of the International Searching Authority, Application No. PCT/SE2015/050329, 11 pages.
(Continued)

*Primary Examiner* — Iqbal Zaidi
(74) *Attorney, Agent, or Firm* — Sage Patent Group

(57) ABSTRACT

A method is provided to determine radio channel metrics for radio communication between a plurality of remote radio heads and a wireless device. The method is performed in a remote radio head controller and comprising: selecting a first set of at least one remote radio head; selecting a second set of at least one remote radio head; configuring at least one switch such that only the remote radio heads of the first set communicate radio signals using a first radio branch; configuring at least one switch such that only the remote radio heads of the second set communicate radio signals using a second radio branch; determining a first radio channel metric for radio communication with the wireless device using the first radio branch; and determining a second radio channel metric for radio communication with the wireless device using the second radio branch.

18 Claims, 6 Drawing Sheets

(51) Int. Cl.
*H04W 64/00* (2009.01)
*H04W 88/08* (2009.01)

(58) Field of Classification Search
USPC .................................................. 370/252–339
See application file for complete search history.

(56) References Cited

OTHER PUBLICATIONS

Potevio, "Considerations on RRH subset selection mechanism", 3GPP DRAFT; RI-112582, 3GPP TSG RAN WG1 Meeting #66, Athens, Greece, Aug. 22-26, 2001 (draft date Aug. 16, 2011, XP050537656, 3 pages.
Bertrand, P., "Channel Gain Estimation From Sounding Reference Signal in LTE," IEEE, Published in the Spring 2011 Vehicular Technology Conference (VTC Spring), May 15-18, 2011, 5 pages.
LTE; Evolved Universal Terrestrial Radio Access (U-UTRA); Physical Channels and Modulation (3GPP TS 36.211 V12.3.0 (Sep. 2014) Release 12, pp. 31-44.

* cited by examiner

DETERMINING RADIO CHANNEL METRICS

CROSS REFERENCE TO RELATED APPLICATIONS

This application is a 35 U.S.C. § 371 national stage application of PCT International Application No. PCT/SE2015/050329, filed on Mar. 20, 2015, the disclosure and content of which is incorporated by reference herein in its entirety.

TECHNICAL FIELD

The invention relates to a method, a remote radio head controller, a computer program and a computer program product for determining radio channel metrics.

BACKGROUND

When deploying wireless communication networks, there is a balance between coverage and capacity. On the one hand, a few large cells can provide great coverage but at a cost of reduced capacity. On the other hand, a scenario with many small cells creates better capacity and throughput, but may not provide the desired coverage. Hence, there is often a combination of larger cells to provide sufficient coverage with smaller cells to provide better capacity.

However, when the cells get too small, wireless devices moving in the network cause a great number of handovers which causes significant overhead. Moreover, providing coverage indoors using many small cells can be quite costly, with a radio base station for each such small cell.

One solution to this problem is to use remote radio heads, where several remote radio heads connected to the same radio base station share the same cell. In this way, a single radio base station can provide coverage in different parts of the building by placing the remote radio heads appropriately. Moreover, the wireless device can move between the coverage of different remote radio heads while staying within the same cell, thus avoiding causing handovers. The wireless device will not realize that it is served by different remote radio heads, but see it as one single cell.

When uplink signals from the remote radio heads are in the analogue domain, and these are combined in a combiner, this combination can occur coherently or non-coherently. In coherent combining, phases of the distorted desired signals are aligned prior to combining by multiplying the distorted desired signals with conjugates of respective channel estimations, increasing the signal-to-interference plus noise-ratio (SINR) of the combined signal. Several combining algorithms are available for coherent combining, including maximum-ratio combining (MRC), equal-gain combining, etc. On the other hand, for non-coherent combining, there is no phase alignment for the distorted desired signals, and the combined signal is simply the sum of all received signals. Therefore, the SINR in linear domain of the non-coherently combined signal will be equal to a linear combination, or a weighted average, of the SINRs of individual received signals.

Hence, for non-coherent combining, when one or several remote radio heads receive strong interference, i.e. having low SINR, the overall SINR is substantially degraded compared to coherent combining.

SUMMARY

It is an object to improve measurements for a wireless device of different sets of remote radio heads.

According to a first aspect, it is presented a method for determining radio channel metrics for radio communication between a plurality of remote radio heads and a wireless device. The method is performed in a remote radio head controller and comprising the steps of: selecting a first set of at least one remote radio head, selected from the plurality of remote radio heads; selecting a second set of at least one remote radio head, the second set differing from the first set; configuring at least one switch such that only the remote radio heads of the first set communicate radio signals using a first radio branch; configuring at least one switch such that only the remote radio heads of the second set communicate radio signals using a second radio branch; determining a first radio channel metric for radio communication with the wireless device using the first radio branch of the remote radio heads; and determining a second radio channel metric for radio communication with the wireless device using the second radio branch of the remote radio heads.

The method may further comprise the step of: receiving uplink user data using both the first radio branch and the second radio branch of only the first set of remote radio heads.

In the step of selecting a second set, the second set may comprise fewer remote radio heads than the first set and the second set may comprise at least one remote radio head of the first set. In such a case, the method further comprises the steps of: finding a complement set of the second set, within the first set, and selecting a new first set to be the complement set, when the first radio channel metric is better than the second radio channel metric; selecting a new first set to be the second set when the second radio channel metric is better than the first radio channel metric; and repeating, until an exit condition is true, the steps of selecting a second set, configuring the remote radio heads of the first set, configuring the remote radio heads of the second set, determining the first radio channel metric, determining the second radio channel metric, finding a complement set and selecting the new first set.

The exit condition may be that the first set reaches a predetermined size.

The exit condition may be that the first radio channel metric is better than a threshold value.

The exit condition may be that a difference between the first radio channel metric and the second radio channel metric is less than a threshold difference.

In the step of determining a first radio channel metric, a previous second radio channel metric may be reused when the corresponding preceding second set corresponds to the current first set.

The method may further comprise the step of: estimating a position of the wireless device based on positions of each one of the at least one remote radio head of the first set.

The steps may be performed separately for a first wireless device and for a second wireless device. In such a case, the method further comprises the step of: receiving uplink user data from both the first wireless device and the second wireless device using all remote radio heads of a union set, the union set being the union of the first set for the first wireless device and the first set for the second wireless device.

According to a second aspect, it is presented a remote radio head controller for determining radio channel metrics for radio communication between a plurality of remote radio heads and a wireless device. The remote radio head controller comprises: a processor; and a memory storing instructions that, when executed by the processor, causes the remote radio head controller to: select a first set of at least one remote radio head, selected from the plurality of remote radio heads; select a second set of at least one remote radio head, the second set differing from the first set; configure at least one switch such that only the remote radio heads of the first set communicate radio signals using a first radio branch; configure at least one switch such that only the remote radio heads of the second set communicate radio signals using a second radio branch; determine a first radio channel metric for radio communication with the wireless device using the first radio branch of the remote radio heads; and determine a second radio channel metric for radio communication with the wireless device using the second radio branch of the remote radio heads.

The remote radio head controller may further comprise instructions that, when executed by the processor, causes the remote radio head controller to: receive uplink user data using both the first radio branch and the second radio branch of only the first set of remote radio heads.

The second set may comprise fewer remote radio heads than the first set and the second set may comprise at least one remote radio head of the first set. In such a case, the remote radio head controller further comprises instructions that, when executed by the processor, causes the remote radio head controller to: find a complement set of the second set, within the first set, and selecting a new first set to be the complement set, when the first radio channel metric is better than the second radio channel metric; select a new first set to be the second set when the second radio channel metric is better than the first radio channel metric; and repeat, until an exit condition is true, the instructions to select a second set, configure the remote radio heads of the first set, configure the remote radio heads of the second set, determine the first radio channel metric, determine the second radio channel metric, find a complement set and select the new first set.

The exit condition may be that the first set reaches a predetermined size.

The exit condition may be that the first radio channel metric is better than a threshold value.

The exit condition may be that a difference between the first radio channel metric and the second radio channel metric is less than a threshold difference.

In the instructions to determine a first radio channel metric, a previous second radio channel metric may be reused when the corresponding preceding second set corresponds to the current first set.

The remote radio head controller may further comprise instructions that, when executed by the processor, causes the remote radio head controller to: estimate a position of the wireless device based on positions of each one of the at least one remote radio head of the first set.

The instructions may be configured to be performed separately for a first wireless device and for a second wireless device. In such a case, the remote radio head controller further comprises instructions that, when executed by the processor, causes the remote radio head controller to: receive uplink user data from both the first wireless device and the second wireless device using all remote radio heads of a union set, the union set being the union of the first set for the first wireless device and the first set for the second wireless device.

According to a third aspect, it is presented a remote radio head controller comprising: means for selecting a first set of at least one remote radio head, selected from a plurality of remote radio heads; means for selecting a second set of at least one remote radio head, the second set differing from the first set; means for configuring at least one switch such that only the remote radio heads of the first set communicate radio signals using a first radio branch; means for configuring at least one switch such that only the remote radio heads of the second set communicate radio signals using a second radio branch; means for determining a first radio channel metric for radio communication with a wireless device using the first radio branch of the remote radio heads; and means for determining a second radio channel metric for radio communication with the wireless device using the second radio branch of the remote radio heads.

According to a fourth aspect, it is presented a computer program for determining radio channel metrics for radio communication between a plurality of remote radio heads and a wireless device. The computer program comprises computer program code which, when run on a remote radio head controller causes the remote radio head controller to: select a first set of at least one remote radio head, selected from the plurality of remote radio heads; select a second set of at least one remote radio head, the second set differing from the first set; configure at least one switch such that only the remote radio heads of the first set communicate radio signals using a first radio branch; configure at least one switch such that only the remote radio heads of the second set communicate radio signals using a second radio branch; determine a first radio channel metric for radio communication with a wireless device using the first radio branch of the remote radio heads; and determine a second radio channel metric for radio communication with the wireless device using the second radio branch of the remote radio heads.

According to a fifth aspect, it is presented a computer program product comprising a computer program according to fourth and a computer readable means on which the computer program is stored.

According to a sixth aspect, it is a combiner for combining uplink signals from a plurality of remote radio heads. The combiner comprises: a plurality of ports for connecting remote radio heads; a first combiner unit configured to combine signals from a plurality of the ports to a first combined uplink signal for uplink transmission; a second combiner unit configured to combine signals from a plurality of the ports to a second combined uplink signal for uplink transmission; a first set of switches, each switch in the first set being connected between a port and the first combiner unit, wherein the first set of switches are configured to be connected to a first radio branch of any connected remote radio heads; a second set of switches, each switch in the second set being connected between a port and the second combiner unit, wherein the second set of switches are configured to be connected to a second radio branch of any connected remote radio heads; and a controller configured to control the first set of switches and the second set of switches based on received control signalling from a remote radio head controller.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
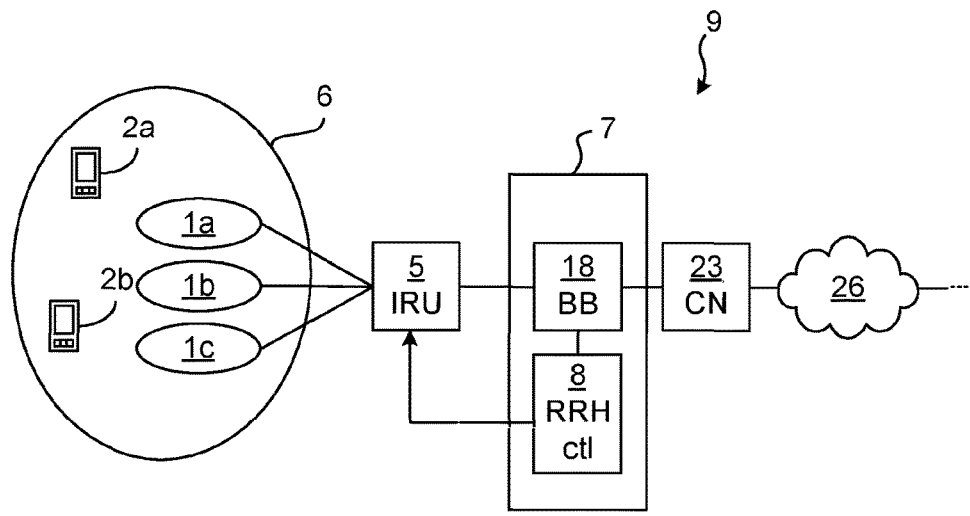
FIG. 1 is a schematic architecture diagram illustrating an environment where embodiments presented herein can be applied.

FIG. 1 is a schematic architecture diagram illustrating an environment where embodiments presented herein can be applied. A wireless communication network 9 comprises a number of remote radio heads (RRHs) 1a-c for installation in locations where traditional deployment with antennas being co-located with the base stations is not ideal. For example, the wireless communication network 9 can be installed indoors, such as in an office, shopping centre, train station or airport.

It is to be noted that, while the embodiments presented herein are described as implemented using LTE (Long Term Evolution) and/or W-CDMA (Wideband Code Division Multiplex), any applicable communication standard may be used, such as any one or a combination of LTE-SAE (Long Term Evolution-System Architecture Evolution), GSM (Global System for Mobile communication), EDGE (Enhanced Data Rates for GSM Evolution), GPRS (General Packet Radio Service), CDMA2000 (Code Division Multiple Access 2000), or any other current or future wireless network, such as LTE-Advanced, as long as the principles described hereinafter are applicable.

A base station 7 here comprises a baseband processor device (BBP) 18 and a remote radio head controller (RRH ctl) 8. A combiner 5 is used in the uplink to combine uplink signals from a plurality of remote radio heads 1a-c and forward data to the baseband processor device 18. In downlink, the combiner 5 may function as a splitter, providing downlink signals from the baseband processor device 18 to each one of the connected remote radio heads 1a-c. The combiner 5 is also known as an indoor radio unit (IRU). It is to be noted though that the combiner may also be provided outdoors whenever appropriate. The combiner is in this way a link for a number (in this example three) of remote radio heads 1a-c. In this way, the base station 7 is a link for uplink and downlink communication for the remote radio heads connected to the combiner 5. One function of the base station 7 is to function as a digital unit (DU), using the one or more baseband processor devices 18, for processing uplink and downlink signals in the digital domain.

It is to be noted that the combiner 5 can be provided separately from the base station 7 as shown in FIG. 1, but the combiner 5 can also be provided as part of the base station 7.

The base station 7 is also connected to a core network 23. The core network 23 provides central functions and connectivity to external networks 26 such as the Internet.

The remote radio heads 1a-c connected to the combiner 5 are part of a single radio cell 6 and thus share a cell identifier. Antennas do not need to be included in this embodiment of the base station 7 or the combiner 5, as the remote radio heads 1a-c provide the antennas for the wireless link to one or more wireless devices 2a-b. The wireless link provided by the remote radio heads 1a-c includes both downlink (DL) communication to the wireless devices 2a-b and uplink (UL) communication from the wireless devices 2a-b. The term wireless device is also known as mobile communication terminal, user equipment (UE), wireless terminal, station (STA), mobile terminal, user terminal, user agent, machine-to-machine devices etc., and can be, for example, what today is commonly known as a mobile phone or a tablet/laptop with wireless connectivity or fixed mounted terminal.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is used herein, denoted the Intermediate Frequency (IF), which is used for communication on the cables between the combiner 5 and the remote radio heads 1a-c.

It is to be noted that the processing of uplink and downlink signals in the combiner and the remote radio heads 1a-c do not need to occur in the digital domain and can be (but do not need to be) performed completely in the analogue domain.

The remote radio heads 1a-c convert from IF to RF for downlink transmission and from RF to IF for uplink reception. Conversely, the combiner 5 converts from digital BB to IF for downlink transmission and from IF to digital BB for uplink reception.

By using IF instead of RF over the cables between the combiner 5 and the remote radio heads 1a-c, cheaper, widely deployed electrical cables can be used, such as Ethernet LAN cabling. In this way, existing indoor cabling can many times be reused during installation, which significantly saves cost, installation time and complexity. Optionally, the remote radio heads 1a-c are also powered over the respective cables.

The transmission and reception is under the control of a MAC (Media Access Control) scheduler in the baseband module 18. The MAC scheduler informs what transmissions should be made and informs, via the downlink signaling, the wireless devices when to transmit and on which frequency and power.

The link between the combiner 5 and the baseband processor device 18 utilises a digital signal interface, such as CPRI (Common Public Radio Interface).

The remote radio head controller 8 controls how the uplink signals from the remote radio heads 1a-c are combined in the combiner 5, as described in more detail below. Specifically, contribution via remote radio heads with poor radio characteristics can be reduced.

It is to be noted that, although FIG. 1 shows the baseband module 18 connected to one combiner 5, each baseband module 18 can be connected to several combiners over a separate link. Moreover, several links can be used between one baseband module 18 and one combiner 5, e.g. where each link can relate to a separate radio branch (such as those used for MIMO (Multiple Input Multiple Output).

It is to be noted that while the embodiment of FIG. 1 shows three remote radio heads 1a-c, there may be fewer or more remote radio heads connected to each combiner 5.

Figure 2:
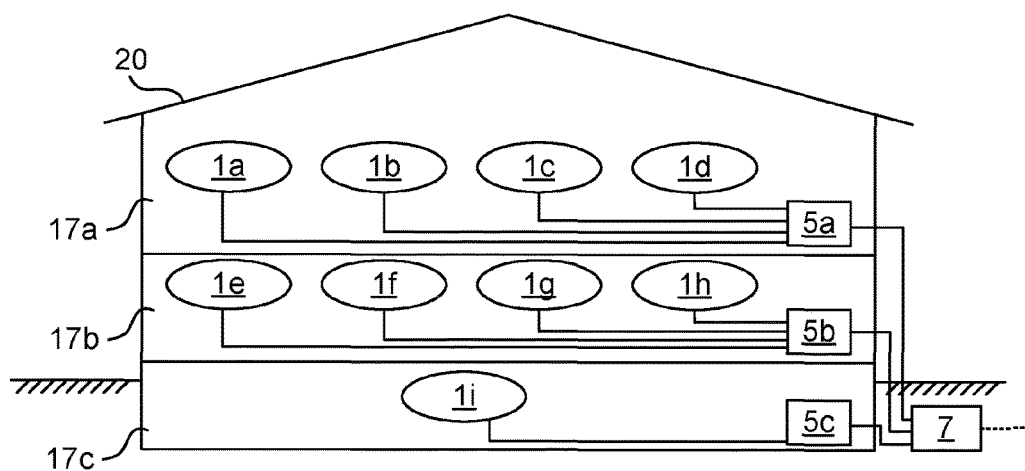
FIG. 2 is a schematic diagram illustrating an example deployment of remote radio heads of FIG. 1 in a multi-storey building.

FIG. 2 is a schematic diagram illustrating an example deployment of remote radio heads in a multi-storey building 20. The building 20 here has a first floor 17a, a ground floor 17b and a basement 17c. On the first floor 17a, there are a first remote radio head 1a, a second remote radio head 1b, a third remote radio head 1c and a fourth remote radio head 1d, all connected to a first combiner 5a. On the ground floor 17b, there are a fifth remote radio head 1e, a sixth remote radio head 1f, a seventh remote radio head 1g and an eighth remote radio head 1h all connected to a second combiner 5b. In the basement 17c, there is only a ninth remote radio head ii connected to a third combiner 5c. Each one of the combiners 5a-c is connected to the base station (and its one or more baseband processing devices) via one or more respective digital (e.g. CPRI) links.

Figure 3A:
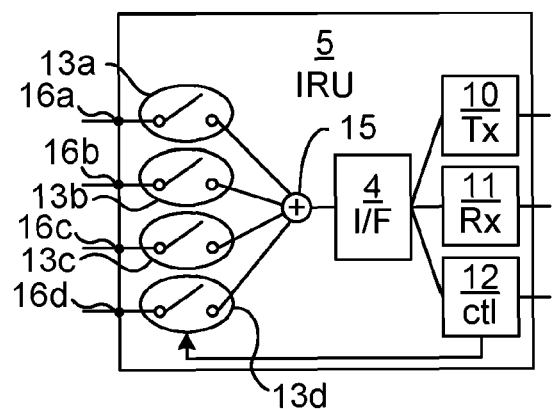
FIGS. 3A-C are schematic diagrams illustrating embodiments of indoor radio units of FIG. 1.

FIG. 3A is a schematic diagram illustrating components of an embodiment of a combiner of FIG. 1. The combiner and its components will now be explained in a context of uplink and downlink communication using a remote radio head.

For uplink communication, the remote radio heads downconvert a received (uplink) signal to IF and send it over its cable to the combiner 5. The received IF signals from several remote radio heads are received in respective ports 16a-d, after which the signals are combined in a combiner unit 15 and fed to an interface circuitry 4. The interface circuitry 4 extracts the received IF signal from the interface and forwards it to the RX (reception) back-end 11. In one embodiment, the RX backend 11 comprises an analogue to digital (A/D) converter which samples the signal on IF and converts to a digital signal. In another embodiment, the RX back-end 11 first downconverts the received signals from IF to an analogue BB (baseband) signal which is further filtered and converted to a digital signal in an A/D converter. The RX back-end 11 sends the combined received signals in digital form (e.g. over CPRI) to the baseband processing device for further processing such as radio channel metrics, demodulation, decoding, etc. as known in the art per se.

Prior to combining in the combiner unit 15, there is a respective switch 13a-d between each port (for connecting a respective remote radio head) and the combiner unit 15. The switches 13a-d are controllable by the controller 12 to thereby block or allow uplink contribution from zero, one or more of the connected remote radio heads. Optionally, the switches 13a-d are controllable to reduce contribution without blocking, by attenuating the uplink signal. The switches 13a-d can also be deployed for downlink communication.

For downlink communication, the process works in reverse to the uplink. Hence, the baseband module sends a digital BB signal for transmission to a TX (transmission) back-end 10 of the combiner 5. In one embodiment, the TX back-end 10 converts the digital BB signal to an analogue signal in IF directly in a digital to analogue (D/A) converter. In another embodiment, the TX back-end 10 first converts the digital BB signal to an analogue transmission signal and upconverts the transmission signal to IF in the analogue domain. The transmission signal in IF is then inserted onto the interface by the interface circuitry 4, and provided to the combiner unit 15 which also functions as a splitter, providing the same transmission signal in IF to all connected remote radio heads over the respective cables. The remote radio heads then upconvert the IF signal to RF and transmit the RF signal over the air to the wireless devices 2a-b.

Moreover, there is a control link between a controller 12 in the combiner 5 and each remote radio head. This control link can be used e.g. to control the switches 13a-d.

Figure 3B:
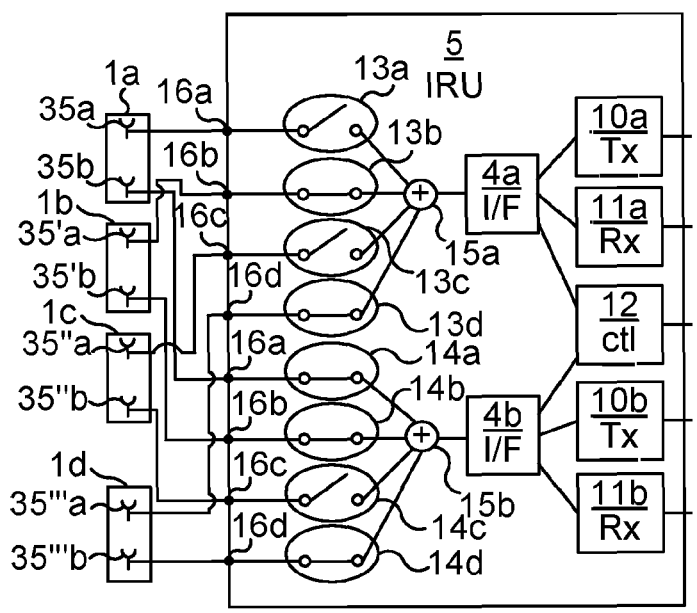

FIG. 3B shows an embodiment of the combiner 5, where different radio branches of the remote radio heads are connected to different combiner units.

The first remote radio head is comprises a first antenna 35a and a second antenna 35b. The first remote radio head 1a is connected to the first port 16a of the combiner 5 but the port is split into an upper part and a lower part, such that the first antenna 35a is connected to the upper part and the second antenna 35b is connected to the lower part.

The second remote radio head 1b comprises a first antenna 35'a and a second antenna 35'b. The second remote radio head 1b is connected to the second port 16b of the combiner 5 but the port is split into an upper part and a lower part, such that the first antenna 35'a is connected to the upper part and the second antenna 35'b is connected to the lower part.

The third remote radio head 1c comprises a first antenna 35"a and a second antenna 35"b. The third remote radio head 1c is connected to the third port 16c of the combiner 5 but the port is split into an upper part and a lower part, such that the first antenna 35"a is connected to the upper part and the second antenna 35"b is connected to the lower part.

The fourth remote radio head 1d comprises a first antenna 35'"a and a second antenna 35'"b. The fourth remote radio head 1d is connected to the fourth port 16d of the combiner 5 but the port is split into an upper part and a lower part, such that the first antenna 35'"a is connected to the upper part and the second antenna 35'"b is connected to the lower part.

The split into the upper part and the lower part of the ports 16a-d can be done internally within the combiner 5, such that only one physical connector needs to be used to connect each remote radio heads to the combiner 5.

The first antennas of the remote radio heads thus form part of a first radio branch and the second antennas of the remote radio heads form part of a second radio branch. The upper parts of the ports 16a-d are connected to a first combiner unit 15a and the lower parts of the ports 16a-d are connected to a second combiner unit 15b.

A first set of switches 13a-d are provided for the first radio branch, such that each switch in the first set is connected between a port and the first combiner unit 15a. The first set of switches are configured to be connected to a first radio branch of any connected remote radio heads, by connecting a first radio branch of each respective remote radio head with the first combiner unit 15a.

A second set of switches 14a-d are provided for the second radio branch, such that each switch in the second set is connected between a port and the second combiner unit 15b. The second set of switches are configured to be connected to a second radio branch of any connected remote radio heads, by connecting a second radio branch of each respective remote radio head with the second combiner unit 15b.

The first combiner unit 15a is connected, through a first interface circuitry 4a, to a first TX back-end 10a and a first RX back-end 11a (see corresponding units above). The second combiner unit 15b is connected, through a second interface circuitry 4b, to a second TX back-end 10b and a second RX back-end 11b (see corresponding units above). A common controller 12 controls all switches 13a-d, 14a-d and general control of the combiner 5, at least partly based on control signalling received from a remote radio head controller (8 of FIG. 1).

A first CPRI link can be used to connect the first TX back-end 10a and the first RX back-end 11a to the baseband processor device 18. A second CPRI link can be used to connect the second TX back-end 10b and the second RX back-end 11b to the baseband processor device 18. In this way, the first radio branch is connected via the first CPRI link and the second radio branch is connected via the second CPRI link. This allows independent metric determination of a first set of remote radio heads and a second set of remote radio heads for a particular wireless device.

It is to be noted that while the embodiment shown in FIG. 3B is used for two radio branches, this can be extended to cover an arbitrary number of radio branches.

Figure 3C:
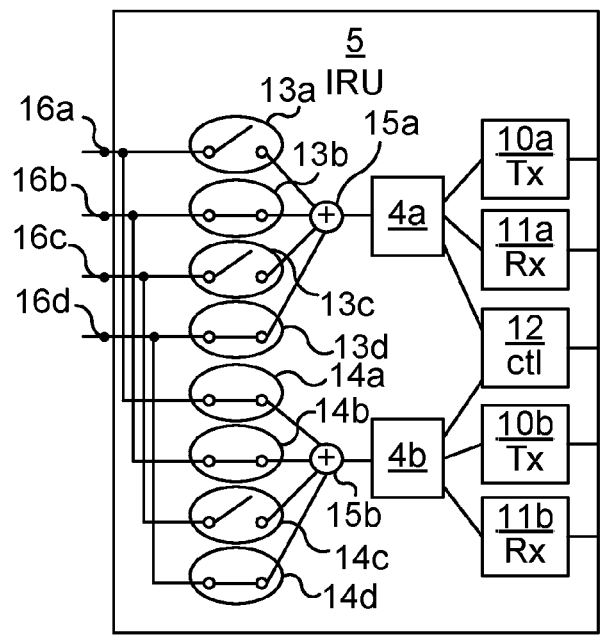

FIG. 3C shows an embodiment of the combiner 5, where signals from the remote radio heads can be combined in two different ways. In this embodiment, each one of the four ports 16a-d is connected both to the first combiner unit 15a and the second combiner unit 15b.

Figure 4:
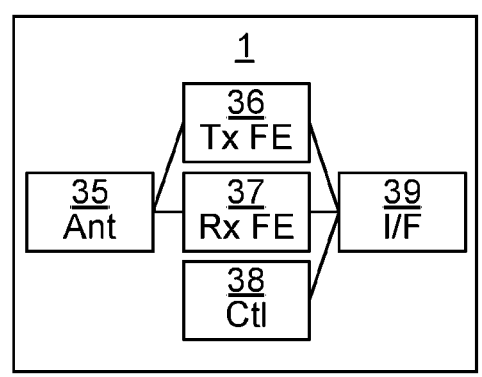
FIG. 4 is a schematic architecture diagram illustrating components of an embodiment of a remote radio head of FIG. 1.

FIG. 4 is a schematic architecture diagram illustrating components of an embodiment of a remote radio head of FIG. 1, here represented by a single remote radio head 1. The remote radio head comprises an interface circuitry 39, a transmission front-end 36, a reception front-end 37, a controller 38 and an antenna device 35. It is to be noted that the antenna device 35 may comprise any number of antennas, e.g. one, two, four, six, eight, etc., each forming part of a separate radio branch. When two or more antennas are used, MIMO (Multiple Input Multiple Output) can be employed. It should also be noted that a remote radio head may also support TDD/FDD operation and multi-band operation.

In line with what is explained above, the RX Front End 37 downconverts received signals in RF to IF for transfer over the cable to the combiner 5. Moreover, the TX Front End 36 upconverts transmission signals from IF, as received over the cable from the combiner 5 to RF for transmission to wireless devices.

The antenna device 35 may comprise one or more antenna elements for each antenna. Particularly, the antenna can comprise one or more antenna elements in a first polarisation and one or more antenna elements in a second polarisation to achieve an additional dimension of orthogonality. The two polarisations may be controlled separately. The antenna device 35 may also comprise appropriate filters to filter out unwanted signals.

The interface circuitry 39 inserts and extracts (multiplexes and demultiplexes) the transmission IF signal, the received IF signal and the control signal onto/from the cable. The interface circuitry 39 may use different frequency bands for uplink signals, downlink signals and control signals to thereby multiplex all of these on a single cable.

A controller 38 communicates with the controller 12 of the combiner. The controller 38 can be implemented using software instructions such as a computer program executed by a processor and/or using only hardware, such as application specific integrated circuits, field programmable gate arrays, discrete logical components, etc. The controller 38 can e.g. be used to modify frequency band usage in IF, during calibration, capturing measurements, etc.

Figure 5A:
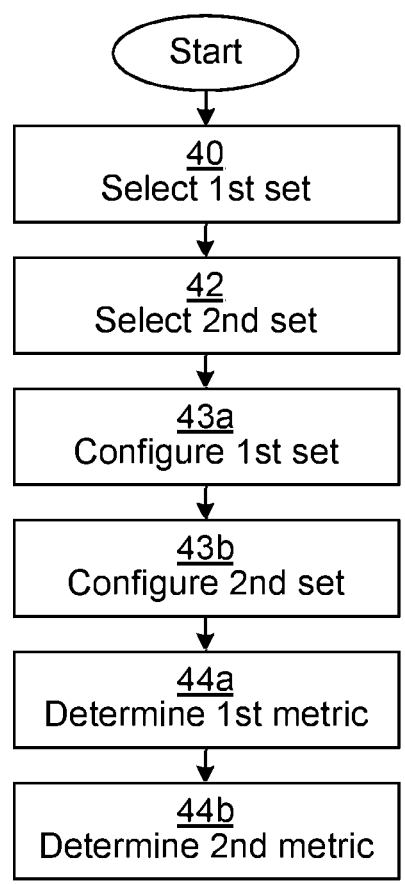
FIGS. 5A-C are flow charts illustrating embodiments of methods performed in the remote radio head controller of FIG. 1.
Figure 5B:
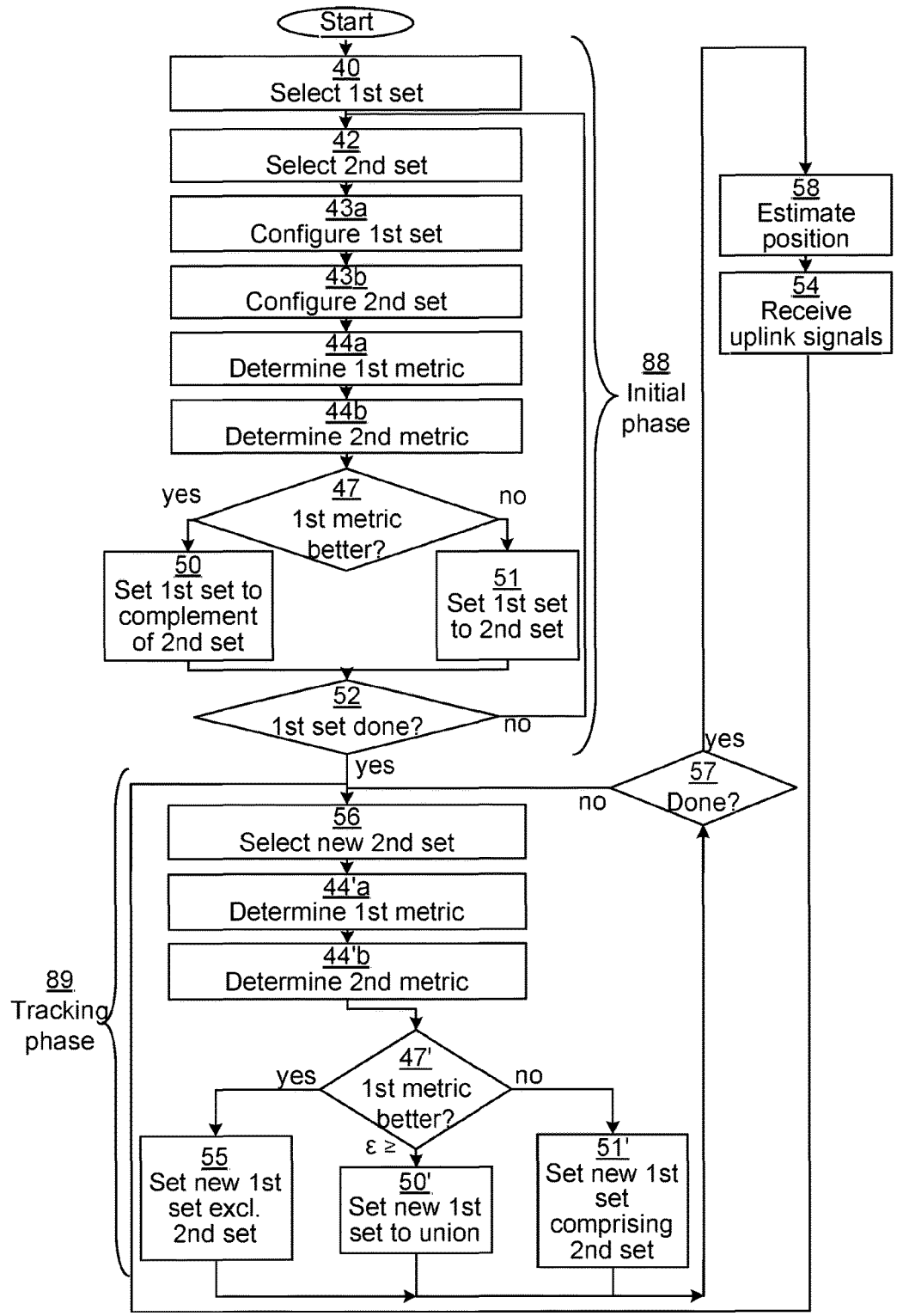

FIGS. 5A-B are flow charts illustrating embodiments of methods performed in the remote radio head controller of FIG. 1 to determine radio channel metrics. First, the method illustrated by the flow chart of FIG. 5A will be described.

In a select $1^{st}$ set step 40, a first set of at least one remote radio head is selected from the plurality of remote radio heads.

In a select $2^{nd}$ set step 42, a second set of at least one remote radio head is selected from the plurality of remote radio heads, where the second set differs from the first set.

In a configure $1^{st}$ set step 43a, at least one switch is configured such that only the remote radio heads of the first set communicate radio signals using a first radio branch.

In a configure $2^{nd}$ set step 43b, at least one switch is configured such that only the remote radio heads of the second set communicate radio signals using a second radio branch.

In a determine $1^{st}$ metric step 44a, a first radio channel metric is determined for radio communication with the wireless device using the first radio branch of the remote radio heads.

In a determine $2^{nd}$ metric step 44b, a second radio channel metric is determined for radio communication with the wireless device using the second radio branch of the remote radio heads.

The first metric and the second metric are provided in entities which are comparable in order to allow determination of which metric value is better. In one embodiment, the first metric and the second metric are determine based on Sounding Reference Signals (SRS) transmitted by the wireless device. For instance, the first metric and the second metric can be the same of the same entity. In one embodiment, the first metric and the second metric are determined as SINR values. In such a case, a higher value is better.

Using this method, measurements can be obtained for two separate sets in parallel.

Looking now to FIG. 5B, only new or modified steps compared to the method illustrated by the flow chart of FIG. 5A will be described.

In one embodiment, in the select $2^{nd}$ set step 42, the second set comprises fewer remote radio heads than the first set, and the second set also comprises at least one remote radio head of the first set. In one embodiment, the second set is a strict subset of the first set. In one embodiment, a previous second radio channel metric is reused when the corresponding preceding second set corresponds to the current first set.

In a conditional $1^{st}$ metric better step 47, it is determined whether the first radio channel metric is better than the second radio channel metric. If this is the case, the method proceeds to a set $1^{st}$ set to complement of $2^{nd}$ set step 50. Otherwise, the method proceeds to a set $1^{st}$ set to $2^{nd}$ set step 51.

In the set $1^{st}$ set to complement of $2^{nd}$ set step 50, a complement set of the second set, within the first set, is found. Also, a new first set is selected to be the complement set.

In the set $1^{st}$ set to $2^{nd}$ set step 51, a new first set is selected to be the second set.

In a conditional $1^{st}$ set done step 52, it is determined whether an exit condition is true. The exit condition is a exit condition for an initial phase. If the exit condition is false, the method returns to the select $2^{nd}$ set step 42. Otherwise, the method proceeds to a select new $2^{nd}$ set step 56. In one embodiment, the exit condition is that the first set reaches a predetermined size, e.g. one, corresponding to an (at least local) optimum. In one embodiment, the exit condition is that the first radio channel metric is better than a threshold value. In one embodiment, the exit condition is that a difference between the first radio channel metric and the second radio channel metric is less than a threshold difference, i.e. that further selections will not make much of a difference. During the iterations, the first set is the best estimate for communicating with the wireless device, at least for the uplink, but possibly also for downlink. Hence, the first set can be used for communication with the wireless device during this process, since measurements can occur e.g. during SRS slots, in between which communication of user data can occur.

The steps 40, 42, 43*a*, 43*b*, 44*a*, 44*b*, 47, 50, 51 and 52 form an initial phase 88. Using the initial phase, the first set of remote radio heads is successively reduced, where in each iteration, the least successful of the second set and the complement of the second set is discarded. This provides an efficient way to find, at least a local, optimum. In many cases, this will result in finding the best performing remote radio head (if the exit condition is that the first set is to reach the size of one) for communication with the wireless device in ceiling(log 2($N_{node}$)) iterations, where $N_{node}$ is the number of remote radio heads. Even if a global optimum is not found, this can be found in the subsequent tracking phase 89.

The initial phase will now be illustrated with an example.

When a wireless device connects to the cell of the remote radio heads, there is no information about the received SINR of any remote radio head.

In step 40, the first set is selected $N_1$: in the beginning at time kT all $N_{node}$ remote radio heads are active, such that $|N_1(k)|=N_{node}$.

In step 42, the second set is selected as one half of the remote radio heads within the first set, such that $|N_2(k)|=|N_1(k)|/2$. The second set is exclusively used for estimating the SINR of $N_2(k)$, while all reception of payload data is conducted using the first set.

In step 44*a*, the SINR for the wireless device using the first set is estimated.

In step 44*b*, the SINR for the wireless device using the second set is estimated.

In step 47, the SINR of the two sets are compared, i.e. whether the SINR of the second set is larger than the SINR of the first set $$SINR_2 > SINR_1 + \varepsilon \text{ [dB]} \qquad (1)$$

where $\varepsilon$ is a small positive constant, typically about 1 dB.

If (1) is true, it is verified that the remote radio heads within the second set capture the relevant useful signal, while the remaining remote radio heads mainly add noise and interference. Then, in step 51, the first set is set to be the second set for the next iteration in time instant (k+1)T, such that $N_1(k+1)=N_2(k)$. For embodiments where $SINR_1$ cannot be estimated at each time instant kT, the SINR of the first set at the next time instant may be adjusted according to $SINR_1(k+1)=SINR_2(k)$.

If (1) is false, the second set mainly contributes noise and interference to the received signal after combining. Hence, it may be concluded that the remaining remote radio heads $N_1 \setminus N_2$ capture most of the useful signal. The first set for the next time instant is therefore composed of the complement to the second set, such that $N_1(k+1)=N_1(k) \setminus N_2(k)$. Since the remote radio heads of the second set are excluded from the first set at time (k+1)T, the contributions from the useful signal as well as the interference plus noise powers of the second set are removed, such that the SINR in the linear domain becomes $$\frac{S_1(k+1)}{\sigma_1^2(k+1)} = \frac{S_1(k) - S_2(k)}{\sigma_1^2(k) - \sigma_2^2(k)} \qquad (2)$$

where $s_1(k)$ and $s_2(k)$ (in Watts) are the contributions of the useful signal powers of the first and second sets at time kT, respectively. Likewise, $\sigma_1^2(k)$ and $\sigma_2^2(k)$ (in Watts) are the contributions of the interference plus noise powers of the first and second sets, respectively. Using the SINR estimation procedure, estimates of $s_1(k)$, $s_2(k)$, $\sigma_1^2(k)$ and $\sigma_2^2(k)$ are readily available.

If $s_1(k) \gg s_2(k)$, the SINR of the first set $N_1(k+1)$ may be approximated by $$SINR_1(k+1) \approx SINR_1(k) - 10 \log_{10}(1-r) \text{ [dB]} \qquad (3)$$

where $r=\sigma_2^2/\sigma_1^2$. We note that, since the second set is a subset of the first set, we have r<1. Moreover, the closer r approaches 1, the more interference plus noise is captured by the second set $N_2(k)$. Hence the larger the gain in SINR in the next time instant for $N_1(k+1)$.

In case estimates of the interference plus noise powers $\sigma_2^2$, $\sigma_1^2$ are not available, it may be assumed that the SINR for $N_1(k+1)$ stays approximately the same, such that $SINR_1(k+1) \approx SINR_1(k)$.

In step 52, the method is determined to repeat until $|N_1(k)|=1$.

It is also possible to determine the SINR of the second strongest remote radio head, not only the strongest one. The two last measurements at step 47 yields SINRs of the signals y1 and y1+y2, where y1 and y2 are the received signals from the strongest and second strongest remote radio head, respectively. From these estimates it is possible to determine the SINR of y2.

It is possible that the tree search algorithm might not always find the overall best remote radio head. For instance, suppose that during the initial phase the overall best and worst remote radio heads are within the same subset. In this case, it might happen that the combined SINR for those remote radio heads is smaller than the combined SINR of all remote radio heads. Then the other subset, which does not contain the remote radio head providing the highest SINR, will be selected as $N_1$ in next step and the searching will proceed in the wrong direction.

In case the initial phase gets stuck in such a local optimum, the best remote radio head may be found during the tracking phase described below.

After the initial phase 88 is done, the method can proceed to a tracking phase 89. The tracking phase 89 comprises steps 56, 44'*a*, 44'*b*, 55, 47', 50', 51', and 57.

In a select new $2^{nd}$ set step 56, a new second set is selected which consists of at least one remote radio head. The new second set comprises at least one remote radio head which differs from the first set and the new second set differing from the preceding second set.

In a determine $1^{st}$ metric step 44'*a*, a first radio channel metric is determined for radio communication with a wireless device. This metric is obtained using all remote radio heads of the first set, e.g. using a first radio branch.

In a determine $2^{nd}$ metric step 44'*b*, a second radio channel metric is determined for radio communication with the wireless device. This metric is obtained using all remote radio heads of the second set, e.g. using a second radio branch.

In a conditional 1$^{st}$ metric better step 47' it is determined whether the first radio channel metric is better than the second radio channel metric. If the first metric is better than a specified margin than the second metric, the method proceeds to a set new 1$^{st}$ set excluding 2$^{nd}$ set step 55. If the second metric is better than a specified margin than the first metric, the method proceeds to a set new 1$^{st}$ set comprising 2$^{nd}$ set step 51'. Otherwise, the method proceeds to a set new 1$^{st}$ set to union step 50'.

In the set new 1$^{st}$ set excluding 2$^{nd}$ set step 55, the new first set is set to exclude the second set. For instance, the new first set can be set to be the current first set, while excluding any elements of the second set.

In the set new 1$^{st}$ set comprising 2$^{nd}$ set step 51' a new first set is selected which comprises the at least one remote radio head of the second set. In one embodiment, the new first set is selected to be the current second set.

In the set new 1$^{st}$ set to union step 50' a new first set is selected to be the union of the first set and the second set when a difference between the first radio channel metric and the second radio channel metric is less than the specified margin.

In a conditional done step 57, it is determine whether the tracking phase 89 is done. If this is not the case, the method returns to the select new 2$^{nd}$ set step 56. Otherwise, the method proceeds to an estimate position step 58. Step 57 can determine whether the tracking is done by determining whether all of a predefined set of combinations (such as, but not limited to, all combinations) of the remote radio heads of the second set have been tested.

In the estimate position step 58, a position of the wireless device is estimated based on positions of each one of the at least one remote radio head of the first set. This is based on the wireless device being estimated to be closest to the remote radio head which gives the best metrics for communicating with the wireless device. While this may not always be accurate, it gives a good guidance on position in the absence of other positioning procedures, which may especially be useful in indoor environments where GPS (Global Positioning System) signals are faint or absent.

In a receive uplink signals step 54, uplink user data is received using both the first radio branch and the second radio branch of only the first set of remote radio heads. Both radio branches are used for the reception, since the use of separate radio branches for the two sets only needs to occur when metrics are obtained. It is to be noted that this step can be performed at other occasions in the method, in an intermittent manner in between periods of obtaining metrics, e.g. between SRS slots. Alternatively or additionally, (downlink) transmission to the wireless device can also be performed using both the first radio branch and the second radio branch of only the first set of remote radio heads.

The tracking phase 89 can be repeated, optionally after an idle period, indefinitely until the wireless device leaves the cell or otherwise disconnects from the cell comprising the remote radio heads. In this way, movement of the wireless device, which results in a new remote radio head being the optimal remote radio head, will be picked up and the first set is adapted to this movement of the wireless device, i.e. tracking the wireless device.

The tracking phase 89 will now be illustrated with an example.

When in tracking mode, the remote radio head (or a subset of remote radio heads) within one cell that provides the highest SINR for a certain wireless device is identified, while all remaining remote radio heads are muted. The objective of the tracking phase is to track user mobility and/or to adapt to changes in the propagation environment.

The first set $N_1$ is given by the initial phase 38 or in some other way. $N_1(k)$ at time kT is a subset of the $N_{node}$ remote radio heads per cell which are active, such that $|N_1(k)| \leq N_{node}$.

In step 56, the second set of remote radio heads $N_2(k)$ is selected, e.g. by cyclically sweeping through all remote radio heads, such that at a given time instant kT the second set consists of one remote radio head. Hence, in the tracking phase, the cardinality of the second set is typically equal to one, so that $|N_2(k)|=1$. The second set is only used for estimating the SINR of $N_2(k)$, while all reception of payload data is conducted using the first set.

In step 44'$a$, the SINR of the first set is estimated.
In step 44'$b$, the SINR of the second set is estimated.
In step 47', the SINRs of the first set and the second set are compared. The outcome of the SINR check is classified into 3 cases. The first case is that the remote radio head (s) within the second set capture the relevant useful signal, while the remaining remote radio heads mainly add noise and interference. In this case the SINR comparison yields:

$$SINR_2 > SINR_1 + \varepsilon \text{ [dB]} \quad (4)$$

where $\varepsilon > 0$ is a small positive constant, with a typical value around 1 dB. Then, in step 51', the first set of remote radio heads in the next time instant (k+1)T is taken from the second set, such that $N_1(k+1)=N_2(k)$. For embodiments where $SINR_1$ cannot be estimated at each time instant kT, the SINR of the first set at the next time instant may be adjusted according to $SINR_1(k+1)=SINR_2(k)$.

The second case is that the SINR of both the first and second sets are similar, i.e. the SINR comparison yields:

$$|SINR_2 - SINR_1| \leq \varepsilon \text{ [dB]} \quad (5)$$

If (5) holds, both remote radio head subsets contribute to the useful signal quality. Hence, it is meaningful, in step 50', to activate both subsets of remote radio heads. The first set of remote radio heads in the next time instant (k+1)T becomes $N_1(k+1)=N_1(k) \cup N_2(k)$. Since the SINRs of both sets are similar, the SINR after non-coherent combining of both sets will also be approximately the same, such that $SINR_1(k+1) \approx SINR_1(k)$.

The third case is that neither (4) and (5) are true, whereby the second set mainly contributes noise and interference to the received signal after combining, and the SINR check yields:

$$SINR_1 > SINR_2 + \varepsilon \text{ [dB]} \quad (6)$$

Hence, it may be concluded that those remote radio heads that are within the first set but not in the second set, $N_1 \setminus N_2$, capture most of the useful signal. The first set for the next time instant is composed of those receiving remote radio heads of the first set that are not part of the second set, such that $N_1(k+1)=N_1(k) \setminus N_2(k)$.

If the SINR for time instant (k+1)T cannot be measured, $SINR_1(k+1)$ can be estimated. For this two cases need to be distinguished:
  i. $N_1(k) \cap N_2(k) = \emptyset$, no remote radio head of the second set is part of the first set: then the SINR of the first set for time instant (k+1)T yields $SINR_1(k+1)=SINR_1(k)$.
  ii. $N_1(k) \cap N_2(k) = N_2(k)$, all remote radio heads of the second set are part of the first set: the contributions from the useful signal as well as the interference plus noise powers of the second set are removed, such that the SINR in the linear domain becomes $$\frac{S_1(k+1)}{\sigma_1^2(k+1)} = \frac{S_1(k) - S_2(k)}{\sigma_1^2(k) - \sigma_2^2(k)}$$

where $s_1(k)$ and $s_2(k)$ (in Watts) are the contributions of the useful signal powers of the first and second sets at time kT, respectively. Likewise, $\sigma_1^{\ 1}(k)$ and $\sigma_2^{\ 2}(k)$ (in Watts) are the contributions of the interference plus noise powers of the first and second sets, respectively. The SINR calculation is according to the description for the initial phase 88. This implies that the further approximations to determine $SINR_1(k=1)$ as described for the initial phase above apply.

A special case is obtained when setting ε=0, then (5) is never met, and the algorithm will find the receiving remote radio head with the strongest SINR towards the considered wireless device.

The tracking phase continues as long as the considered wireless device stays in the cell.

It is also possible to determine the SINR of all receiving remote radio heads, not only the strongest one. This can simply be done by storing the SINR estimates of the second set, $SINR_2(k)$, for each remote radio head, when the second set contains exactly one RRH.

It is to be noted that the initial phase 88 can be performed without performing the tracking phase 89 and vice versa.

Figure 5C:
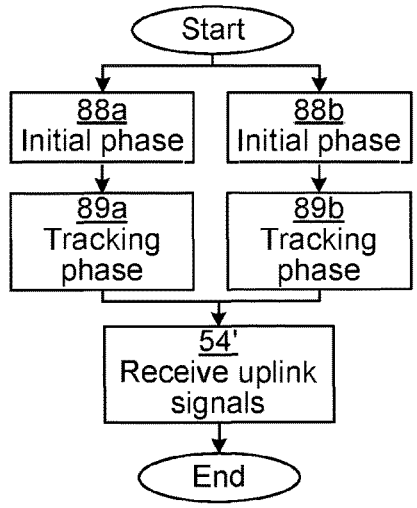

In FIG. 5C, a method is illustrated which is used for several wireless devices. Specifically, there is a first initial phase 88a and a first tracking phase 89a for a first wireless device. Moreover, there is a second initial phase 88b and a second tracking phase 89b for a second wireless device.

Separate from these phases, there is a receive uplink signals step 54', which may be performed in parallel or subsequently to the phases.

In the receive uplink signals step 54', uplink user data is received from both the first wireless device and the second wireless device using all remote radio heads of a union set. The union set is the union of the first set for the first wireless device and the first set for the second wireless device. Alternatively or additionally, transmission to the wireless device can also be performed using all remote radio heads of a union set.

Figure 6:
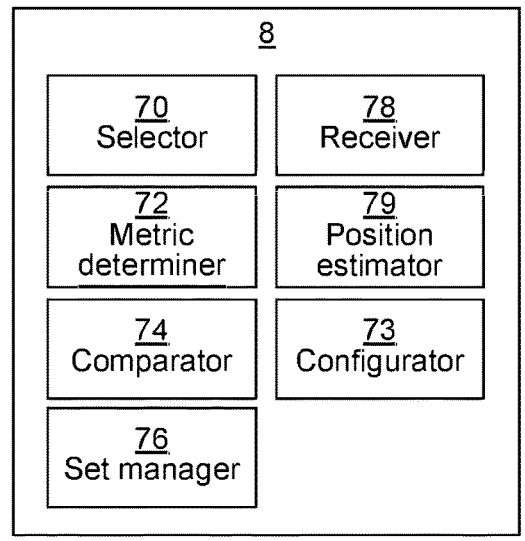
FIG. 6 is a schematic diagram showing some components of an embodiment of the remote radio head controller of FIG. 1.

FIG. 6 is a schematic diagram showing functional modules of the software instructions of the remote radio head controller 8 of FIG. 1 according to one embodiment. The modules are implemented using software instructions such as a computer program executing in the remote radio head controller 8. The modules correspond to the steps in the methods illustrated in FIGS. 5A-C.

A selector 70 is configured to perform steps 40, 42, and 56.

A metric determiner 72 is configured to perform steps 44a, 44b, 44'a, and 44'b.

A comparator 74 is configured to perform steps 47, and 47'.

A set manager 76 is configured to perform steps 50, 51, 50', and 51'.

A receiver 78 is configured to perform steps 54, and 54'.
A position estimator 79 is configured to perform step 58.
A configurator 73 is configured to perform steps 43a and 43b.

Figure 7:
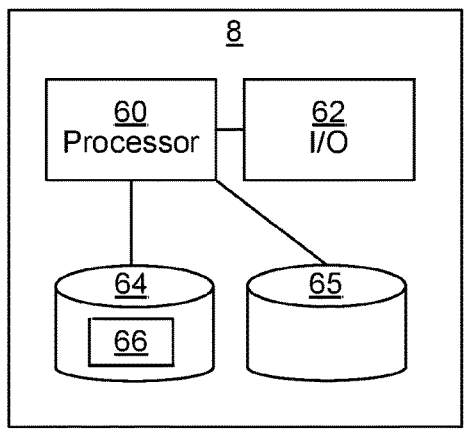
FIG. 7 is a schematic diagram showing functional modules of the software instructions of the remote radio head controller of FIG. 1 according to one embodiment.

FIG. 7 is a schematic diagram showing some components of an embodiment of the remote radio head controller 8 of FIG. 1. It is to be noted that when the remote radio head controller 8 forms part of a host device (e.g. a base station), one or more of the components shown in FIG. 7 may be shared with the host device if appropriate.

A processor 60 is provided using any combination of one or more of a suitable central processing unit (CPU), multiprocessor, microcontroller, digital signal processor (DSP), application specific integrated circuit (ASIC) etc., capable of executing software instructions 66 stored in a memory 64, which can thus be a computer program product. The processor 60 can be configured to execute the methods described with reference to FIGS. 5A-C above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 can be any combination of read and write memory (RAM) and read only memory (ROM). The data memory 65 may also comprise persistent storage, which, for example, can be any single one or combination of magnetic memory, optical memory, solid state memory or even remotely mounted memory. The data memory 65 can e.g. store metric values (e.g. SINR or path loss) for different RRHs for each active wireless device currently within the cell which the remote radio head controller 8 controls.

The remote radio head controller 8 further comprises an I/O interface 62 for communicating with other entities. Optionally, the I/O interface 62 also comprises a user interface for operator control of the remote radio head controller 8.

Other components of the remote radio head controller 8 are omitted in order not to obscure the concepts presented herein.

Figure 8:
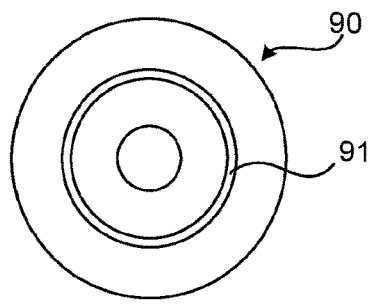
FIG. 8 shows one example of a computer program product comprising computer readable means.

FIG. 8 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 7. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for determining radio channel metrics for radio communication between a plurality of remote radio heads and a wireless device, the method being performed in a remote radio head controller and comprising:
   selecting a first set of at least one remote radio head, selected from the plurality of remote radio heads;
   selecting a second set of at least one remote radio head, the second set differing from the first set;

configuring at least one switch such that only the remote radio heads of the first set communicate radio signals using a first radio branch;
configuring at least one switch such that only the remote radio heads of the second set communicate radio signals using a second radio branch;
determining a first radio channel metric for radio communication with the wireless device using the first radio branch of the remote radio heads; and
determining a second radio channel metric for radio communication with the wireless device using the second radio branch of the remote radio heads;
wherein in selecting a second set, the second set comprises fewer remote radio heads than the first set and the second set comprises at least one remote radio head of the first set, the method further comprising:
finding a complement set of the second set, within the first set, and selecting a new first set to be the complement set, when the first radio channel metric is better than the second radio channel metric;
selecting a new first set to be the second set when the second radio channel metric is better than the first radio channel metric; and
repeating, until an exit condition is true, selecting a second set, configuring the remote radio heads of the first set, configuring the remote radio heads of the second set, determining the first radio channel metric, determining the second radio channel metric, finding a complement set and selecting the new first set.

2. The method according to claim 1, further comprising: receiving uplink user data using both the first radio branch and the second radio branch of only the first set of remote radio heads.

3. The method according to claim 1, wherein the exit condition is that the first set reaches a predetermined size.

4. The method according to claim 1, wherein the exit condition is that the first radio channel metric is better than a threshold value.

5. The method according to claim 1, wherein the exit condition is that a difference between the first radio channel metric and the second radio channel metric is less than a threshold difference.

6. The method according to claim 1, wherein in determining a first radio channel metric, a previous second radio channel metric is reused when the corresponding preceding second set corresponds to the current first set.

7. The method according to claim 1, further comprising: estimating a position of the wireless device based on positions of each one of the at least one remote radio head of the first set.

8. The method according to claim 1, wherein operations are performed separately for a first wireless device and for a second wireless device, the method comprising:
receiving uplink user data from both the first wireless device and the second wireless device using all remote radio heads of a union set, the union set being the union of the first set for the first wireless device and the first set for the second wireless device.

9. A remote radio head controller for determining radio channel metrics for radio communication between a plurality of remote radio heads and a wireless device, the remote radio head controller comprising:
a processor; and
a memory storing instructions that, when executed by the processor, causes the remote radio head controller to:
select a first set of at least one remote radio head, selected from the plurality of remote radio heads;
select a second set of at least one remote radio head, the second set differing from the first set;
configure at least one switch such that only the remote radio heads of the first set communicate radio signals using a first radio branch;
configure at least one switch such that only the remote radio heads of the second set communicate radio signals using a second radio branch;
determine a first radio channel metric for radio communication with the wireless device using the first radio branch of the remote radio heads; and
determine a second radio channel metric for radio communication with the wireless device using the second radio branch of the remote radio heads;
wherein the second set comprises fewer remote radio heads than the first set and the second set comprises at least one remote radio head of the first set, and the remote radio head controller further comprises instructions that, when executed by the processor, causes the remote radio head controller to:
find a complement set of the second set, within the first set, and selecting a new first set to be the complement set, when the first radio channel metric is better than the second radio channel metric;
select a new first set to be the second set when the second radio channel metric is better than the first radio channel metric; and
repeat, until an exit condition is true, the instructions to select a second set, configure the remote radio heads of the first set, configure the remote radio heads of the second set, determine the first radio channel metric, determine the second radio channel metric, find a complement set and select the new first set.

10. The remote radio head controller according to claim 9, further comprising instructions that, when executed by the processor, causes the remote radio head controller to:
receive uplink user data using both the first radio branch and the second radio branch of only the first set of remote radio heads.

11. The remote radio head controller according to claim 9, wherein the exit condition is that the first set reaches a predetermined size.

12. The remote radio head controller according to claim 9, wherein the exit condition is that the first radio channel metric is better than a threshold value.

13. The remote radio head controller according to claim 9, wherein the exit condition is that a difference between the first radio channel metric and the second radio channel metric is less than a threshold difference.

14. The remote radio head controller according to claim 9, wherein in the instructions to determine a first radio channel metric, a previous second radio channel metric is reused when the corresponding preceding second set corresponds to the current first set.

15. The remote radio head controller according to claim 9, further comprising instructions that, when executed by the processor, causes the remote radio head controller to:
estimate a position of the wireless device based on positions of each one of the at least one remote radio head of the first set.

16. The remote radio head controller according to claim 9, wherein the instructions are configured to be performed separately for a first wireless device and for a second wireless device, wherein the remote radio head controller further comprises instructions that, when executed by the processor, causes the remote radio head controller to:
receive uplink user data from both the first wireless device and the second wireless device using all remote radio heads of a union set, the union set being the union of the first set for the first wireless device and the first set for the second wireless device.

17. A computer program product stored in a non-transitory computer readable medium for determining radio channel metrics for radio communication between a plurality of remote radio heads and a wireless device, the computer program product comprising software instructions which, when run on a remote radio head controller causes the remote radio head controller to:
select a first set of at least one remote radio head, selected from the plurality of remote radio heads;
select a second set of at least one remote radio head, the second set differing from the first set;
configure at least one switch such that only the remote radio heads of the first set communicate radio signals using a first radio branch;
configure at least one switch such that only the remote radio heads of the second set communicate radio signals using a second radio branch;
determine a first radio channel metric for radio communication with a wireless device using the first radio branch of the remote radio heads; and
determine a second radio channel metric for radio communication with the wireless device using the second radio branch of the remote radio heads;
wherein the second set comprises fewer remote radio heads than the first set and the second set comprises at least one remote radio head of the first set, and the remote radio head controller further comprises instructions that, when executed by the processor, causes the remote radio head controller to:
find a complement set of the second set, within the first set, and selecting a new first set to be the complement set, when the first radio channel metric is better than the second radio channel metric;
select a new first set to be the second set when the second radio channel metric is better than the first radio channel metric; and
repeat, until an exit condition is true, the instructions to select a second set, configure the remote radio heads of the first set, configure the remote radio heads of the second set, determine the first radio channel metric, determine the second radio channel metric, find a complement set and select the new first set.

18. A combiner for combining uplink signals from a plurality of remote radio heads, the combiner comprising:
a plurality of ports for connecting remote radio heads;
a first combiner configured to combine signals from a plurality of the ports to a first combined uplink signal for uplink transmission;
a second combiner configured to combine signals from a plurality of the ports to a second combined uplink signal for uplink transmission;
a first set of switches, each switch in the first set being connected between a port and the first combiner, wherein the first set of switches are configured to be connected to a first radio branch of any connected remote radio heads;
a second set of switches, each switch in the second set being connected between a port and the second combiner, wherein the second set of switches are configured to be connected to a second radio branch of any connected remote radio heads; and
a controller configured to control the first set of switches and the second set of switches based on received control signalling from a remote radio head controller;
wherein the second set comprises fewer remote radio heads than the first set and the second set comprises at least one remote radio head of the first set, and the remote radio head controller further comprises instructions that, when executed by the processor, causes the remote radio head controller to:
find a complement set of the second set, within the first set, and selecting a new first set to be the complement set, when the first radio channel metric is better than the second radio channel metric;
select a new first set to be the second set when the second radio channel metric is better than the first radio channel metric; and
repeat, until an exit condition is true, the instructions to select a second set, configure the remote radio heads of the first set, configure the remote radio heads of the second set, determine the first radio channel metric, determine the second radio channel metric, find a complement set and select the new first set.

* * * * *